United States Patent [19]

Harris et al.

[11] Patent Number: 5,299,480
[45] Date of Patent: Apr. 5, 1994

[54] METHOD FOR CUTTING WORKPIECES USING A SHUTTLE VISE

[75] Inventors: Gerald R. Harris; Mark P. Richards, both of Chouteau, Okla.

[73] Assignee: Hem, Inc., Pryor, Okla.

[21] Appl. No.: 974,112

[22] Filed: Nov. 10, 1992

[51] Int. Cl.$^5$ .......................... B23D 51/04; B26D 7/06
[52] U.S. Cl. ........................................... 83/27; 83/42; 83/113; 83/277
[58] Field of Search .................. 83/23, 27, 42, 102, 83/111, 112, 113, 153, 206, 225, 226, 229, 277, 282, 107

[56] References Cited

U.S. PATENT DOCUMENTS

| 2,883,736 | 4/1959 | Crane | 83/466 |
|---|---|---|---|
| 3,182,538 | 5/1965 | Whitmore et al. | 83/461 |
| 3,707,103 | 12/1972 | Tishken | 83/113 |
| 3,878,744 | 4/1975 | Luxnat | 83/27 |
| 4,179,961 | 12/1979 | Harris | 83/277 |
| 4,342,240 | 8/1982 | Gaiser et al. | 83/42 |
| 4,398,438 | 8/1983 | Seragnoli | 83/356.3 |
| 4,553,460 | 11/1985 | Stahl et al. | 83/107 |

Primary Examiner—Hien H. Phan
Attorney, Agent, or Firm—Flehr, Hohbach, Test, Albritton & Herbert

[57] ABSTRACT

A method for cutting at least one elongated workpiece (13b) with a saw head assembly (10b) having a cutting blade (11b). The saw assembly (10b) further includes a guide mechanism for providing relative guided movement between the cutting blade (11b) and the workpiece (13b) along a cutting line (14b). The method comprises the steps of placing the workpiece (13b) across the cutting line (14b). Further, moving at least one of the cutting blade (11b) and the workpiece (13b) along the cutting line (14b) from a starting position (28b) on one side (27b') of said workpiece (13b) to a parked position (37b) on an opposite side (27b) of the workpiece (13b). In the parked position, the entire cutting stretch is positioned beyond the workpiece (13b). Next, the cut part or portion (32b) is displaced away from the cutting line (14b) using the workpiece (13b), while the cutting blade (11b) is in the parked position (37b). Thereafter, the workpiece (13b) is returned to the opposite side of the cutting line (14b), and the cutting blade (11b) is returned from the parked position (37b) to the starting position (28b). Accordingly, the cut parts (32b) and the workpiece (13b) are repositioned away from the cutting kerf (15b), which prevents their contact with the cutting blade (11b) during return of the cutting blade (11b) to the starting position (28b).

9 Claims, 4 Drawing Sheets

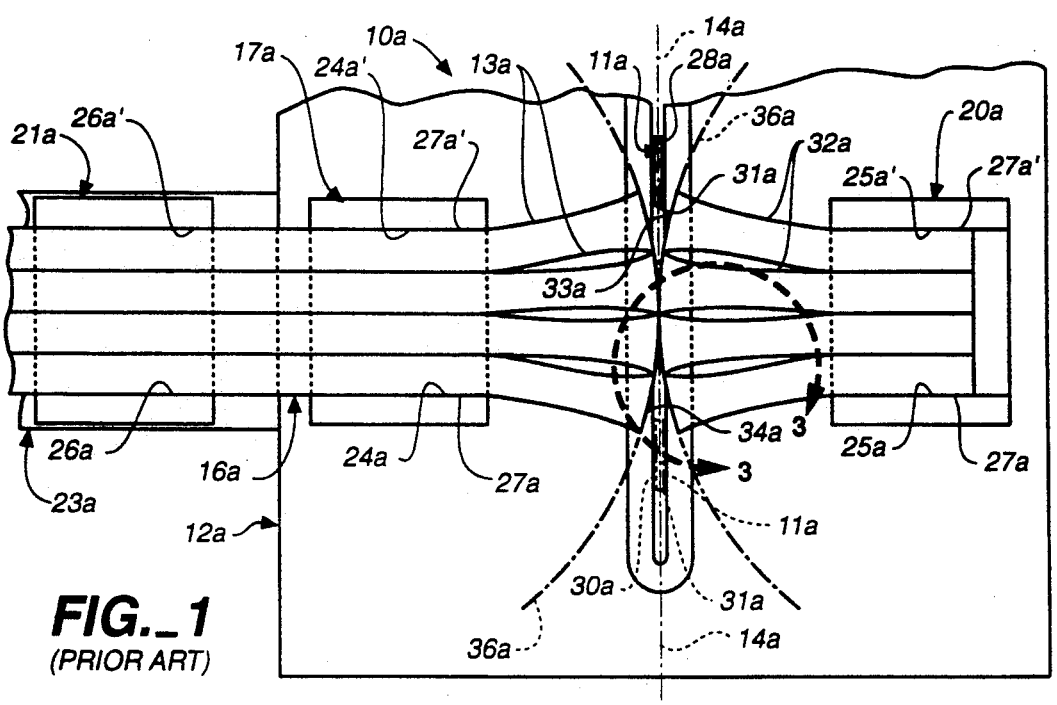
FIG._1
(PRIOR ART)
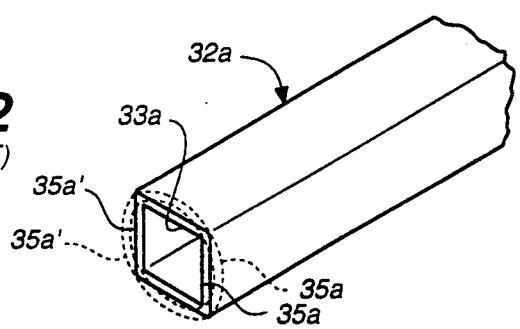
FIG._2
(PRIOR ART)
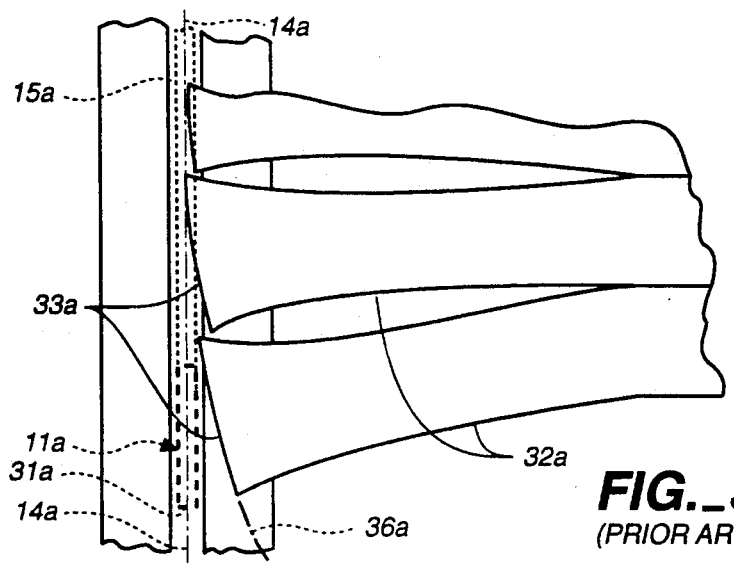
FIG._3
(PRIOR ART)

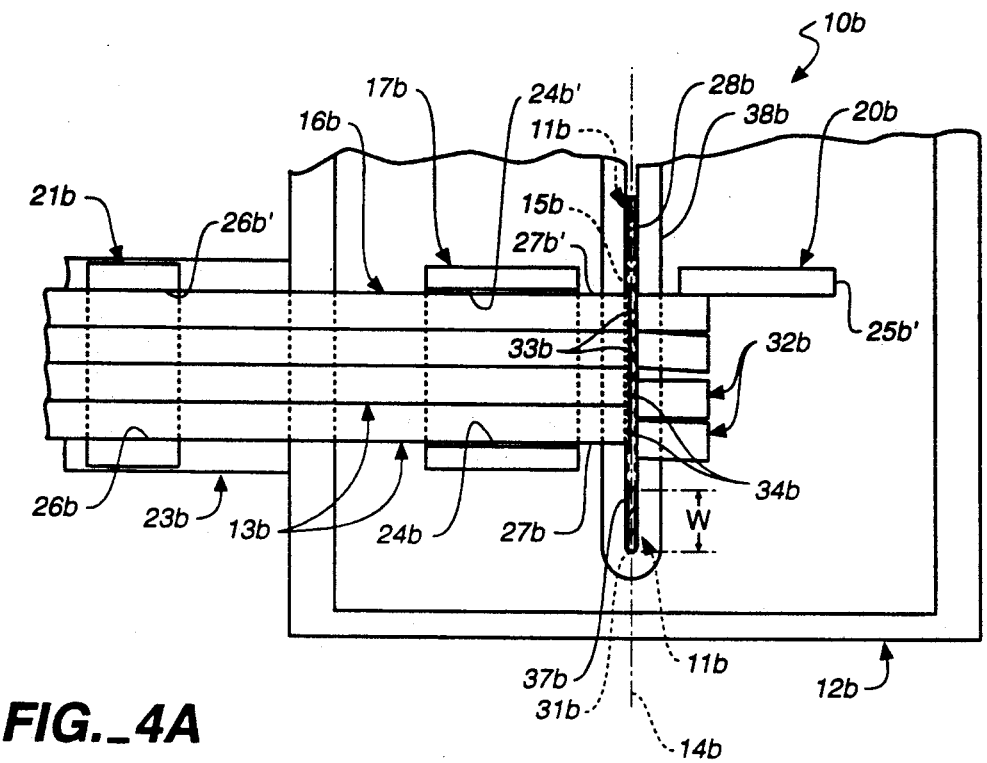
FIG._4A
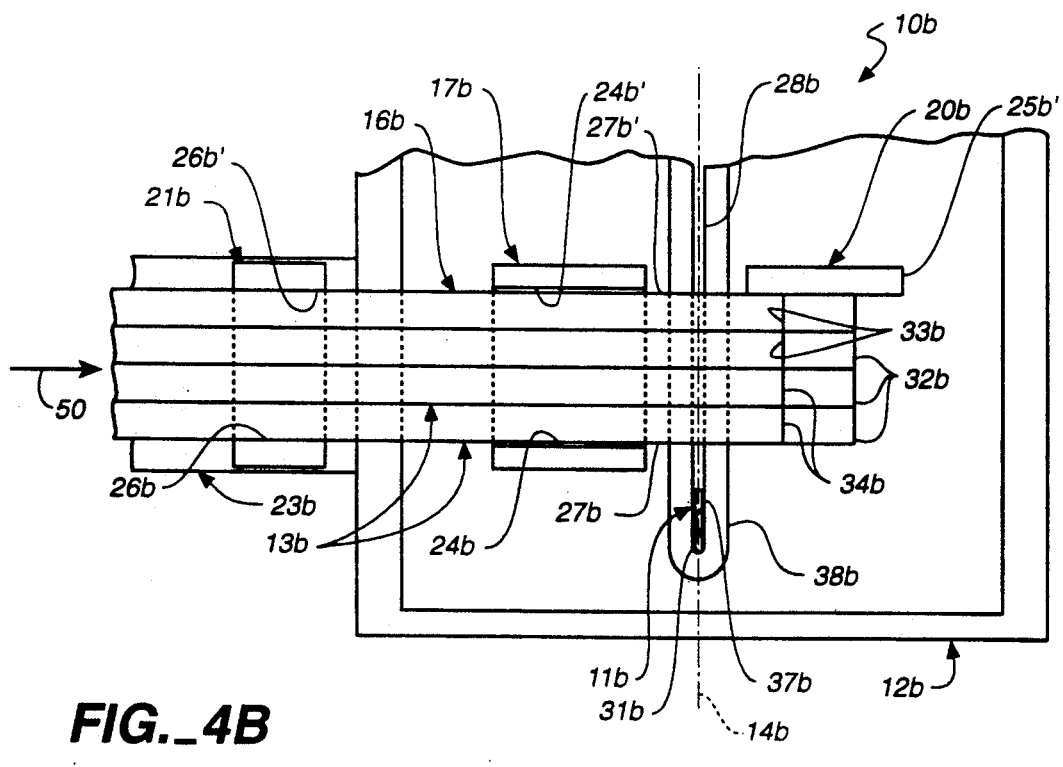
FIG._4B

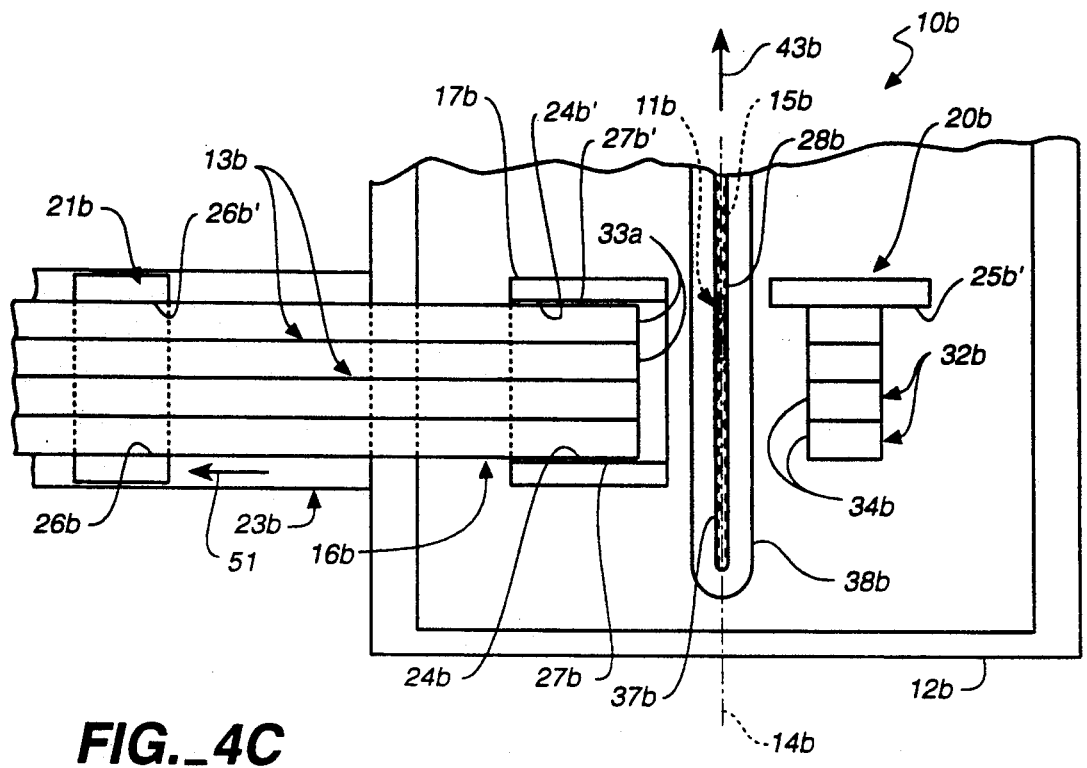
FIG._4C
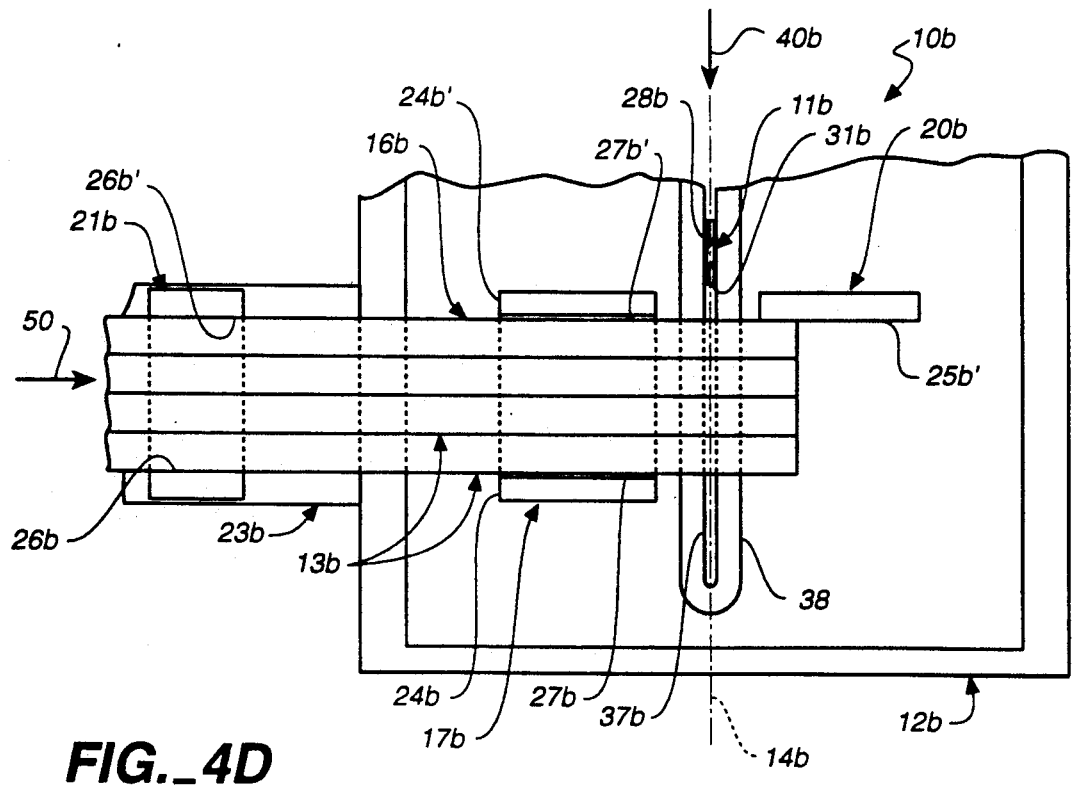
FIG._4D

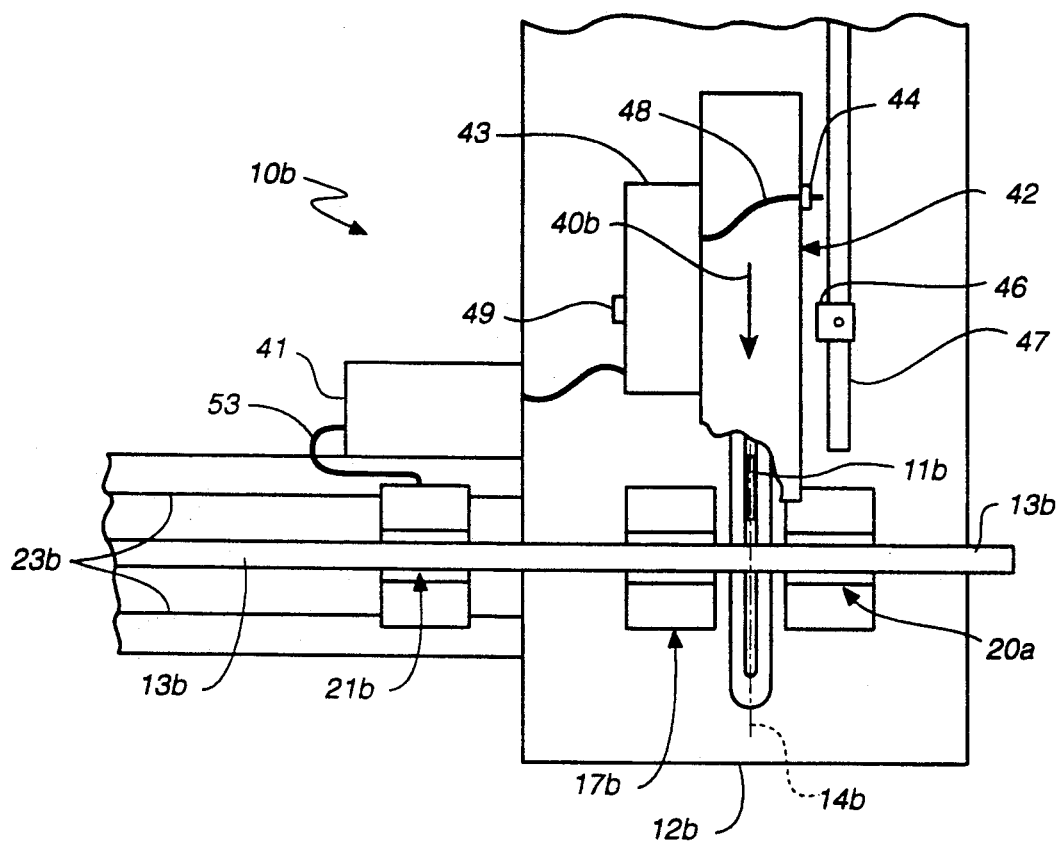
FIG._5

METHOD FOR CUTTING WORKPIECES USING A SHUTTLE VISE

TECHNICAL FIELD

The present invention relates, generally, to workpiece cutting devices and, more particularly, relates to band saw cutting assemblies employing shuttle vises for cutting metal workpieces, such as, bars, rods, tubes, plates and the like.

BACKGROUND ART

Precision cutting of multiple parts from larger workpieces or stock members typically is accomplished by gripping the larger workpiece in a vise assembly and cutting the same with a cutting device, such as a band saw, at a position very close to the vise. The workpiece then advanced beyond the vise and another cut is made. When production runs are undertaken, in which many parts are to be cut from elongated bar or tube stock, the workpieces are automatically advanced for each new cut by a shuttle vise assembly positioned next to the vise at the cutting tool.

Virtually all bar stock, and particularly high-strength, tubular, metal stock, will have internal stress in the stock itself, which stress will be relieved partially when the stock is cut. Moreover, the end of the workpiece being cut off often is supported on the other side of the cut by a workpiece rest or stop and, in some cases, by a vise. As the bar is being cut, therefore, the workpiece will be supported on both ends, much as a beam is supported. When the cut is complete, however, the cut end and the workpiece each become cantilever supported, one from the saw fixed vise and the cut part from the rest or vise on the other side of the cut.

Upon the completion of a cut, therefore, internal stress in the stock and cut part are relieved and both have their support changed from a beam to a cantilever with the end at the cut line free to move. Such movement predictably does occur.

This problem is made worse when tubular stock is cut because the residual internal stress in the tube from the tube forming process is greater. Moreover, when bar stock is bundled and multiple side-by-side pieces cut, the potential for movement is still greater.

FIG. 1 illustrates the above-described precision cutting problem in connection with production cutting of a bundle of workpieces with a band saw. Band saw apparatus $10a$, whether designed primarily for vertical or horizontal cutting, includes a saw head assembly (not shown), which movably supports a flexible continuous loop saw blade $11a$. A cutting table $12a$ upon which workpieces $13a$ are placed may be provided as part of saw assembly $10a$, or as a separate workpiece feed table. Band saw blade $11a$ is movably mounted around a pair of wheels (not shown), one of which is driven. Two or more blade guide assemblies (not shown) are mounted to the head assembly between the wheels and slidably engage saw blade $11a$ to orient it in a cutting orientation. A "cutting stretch" is defined intermediate the saw blade guide assemblies where advancing saw blade $11a$ cuts workpieces $13a$. During motion or advancement of the blade, one of band saw blade $11a$ and workpieces $13a$ are displaced relative to the other along a guided path known as the "cutting line" $14a$, the center line of the desired line of cut. The actual groove, gap or channel of material removed by saw blade $11a$ during cutting is the "kerf" $15a$ (FIG. 3).

Typically, as shown in FIG. 1, a plurality of elongated workpieces $13a$ are positioned in a side-by-side relation and are collectively gripped to form bundle $16a$ by a fixed vise mechanisms $17a$ on one side of blade $11a$ and a second vise $20a$, or by a workpiece rest or support (FIGS. 4A–4D) mounted to table $12a$ on the opposite side of cutting line $14a$. Further, a shuttle vise assembly $21a$ also grips the bundle of workpieces $13a$ at an area away from the cutting line and periodically advances bundle $16a$ forward toward cutting line $14a$. Shuttle vise assembly $21a$ is movably mounted on a track or guide way or rail assembly $23a$ on a feed table, and the shuttle vise $21a$ reciprocates toward and away from cutting line $14a$. Each vise mechanism $17a$, $20a$ and $21a$ includes a pair of spaced-apart gripping jaws $24a$, $24a'$; $25a$, $25a'$; and $26a$, $26a'$, respectively, positioned on opposite sides of bundle side portions $27a$ and $27a'$. The corresponding jaws of each vise mechanism $17a$, $20a$ and $22a$ engage side portions $27a$ and $27a'$ of the workpieces, and at least one of the jaws is movable toward the other to allow gripping of bundle $16a$.

Band saw apparatus $10a$ typically includes a movable head assembly so arranged as to be moved toward and away from the workpieces by suitable means, such as a hydraulic motor or pneumatic apparatus. Thus, in cutting operations, the saw head assembly is displaced, which moves the cutting stretch and hence saw blade $11a$, along cutting line $14a$ relative to table $12a$ and fixed vises $17a$ and $20a$. This enables the driven band saw blade $11a$ to cut across bundle $16a$, which is securely held between the respective jaws of fixed vises Further, shuttle vise assembly $21a$ periodically advances bundle $16a$ forward after the completion of each cutting cycle so that the workpieces can be cut again. A typical band saw apparatus employing a fixed vise and a shuttle vise assembly is disclosed in more detail in U.S. Pat. No. 4,179,961 to Harris, which is incorporated herein by reference.

Typically the band saw head assembly moves saw blade $11a$ across bundle $16a$ from a staring position $28a$ (blade $11a$ shown in solid lines in FIG. 1) to a finishing position $30a$ (blade $11a$ shown in broken lines in FIG. 1) where the cutting edge $31a$ of blade $11a$ has cut completely through bundle $16a$ to sever cut portions or parts $32a$ from workpieces $13a$. As shown in FIGS. 1 and 3, the blade in finishing position $30a$ is positioned so that cutting edge $31a$ is just past side portion $27a$ of bundle $16a$. Since cut portions $32a$ have been completely severed, it is generally regarded as time consuming and wasteful in production band saw cutting to advance blade $11a$ any further along cutting line $14a$. Thus, the controller (not shown) controlling movement of the band saw head assembly will stop advancing the cutting head once cutting edge $31a$ passes through the last workpiece. Often this is set by a movable stop or limit switch (not shown) which terminates advancement of the cutting head.

Once saw blade $11a$ has moved to finishing position $30a$ and before cut portions $32a$ have been removed from vise mechanism $20a$, the saw assembly is returned back along kerf $15a$ and cutting line $14a$ starting position $28a$. This immediate return of the cutting blade minimizes cycle time, which directly affects the cost of cutting of each part.

As above indicated, one common problem encountered when cutting workpieces, and particularly multiple elongated workpieces 13a, is that after saw blade 11a has severed cut portions 32a from bundle 16a, kerf 15a intermediate bundle 16a and cut parts 32a tends to move or close as the internal and clamping stresses are relieved by the cut. This is particularly true for rectangular parallelpiped tubular members, as shown in FIGS. 1-3, and for shorter cut parts 32a, as illustrated in FIG. 4A. With regard to the rectangular, tubular workpieces of FIGS. 1-3, the internal stress of tube formation is relieved during cutting which causes opposite side walls 35a and 35a' proximate individual workpiece ends 34a to flare outwardly (shown exaggerated in broken lines in FIG. 2). In turn, this flaring causes adjacently disposed end portions 33a and 34a of cut portions 31a and workpieces 13a, respectively, to fan outwardly creating the arc-shaped cut ends 33a and 34a, as viewed in FIGS. 1 and 3.

Upon closer inspection, FIG. 3 illustrates that bunching of the flared cut portion ends 33a causes portions thereof to protrude into kerf 15a, which closes the kerf between workpiece ends 34a and cut portion ends 33a.

Hence, upon return of saw blade 11a along cutting line 14a, blade cutting edge 31a often contacts the moved respective ends of cut portions 32a and/or workpieces 13a. Over the course of use, such contact accelerates wear of the saw blade cutting edge 31a (most typically the side facing cut portions 32a). Moreover, in some cases the movement on relief of the internal and clamping stresses is enough that kerf 15a closes sufficiently to wedge against or hook the blade and pull it off of the drive and idler wheels, with disastrous results. Often the blade will be broken, and at a minimum the production process must be shut down and the blade remounted to the cutting head assembly.

Even if the blade is only pulled across the parts, one side of cutting edge 31a will become dull. This results in imprecisely cut workpiece ends 34a and cut portion ends 33a. These deviations not only adversely affect precision and accuracy, but in extreme situations, may necessitate scrapping of cut portions 32a altogether.

When relatively short parts 32a are cut, movement also is quite likely. The shorter length often precludes proper gripping between jaws 25a and 25a' of fixed vise mechanism 20a, and shorter cut portions 32a may not even be gripped during severing. As saw blade 11a cuts through bundle 16a, cut portions 32a are sometimes randomly misaligned, which causes end 33a of cut portions 32a to protrude into kerf 15a. Similarly, during retraction of saw blade 11a back to starting position 28a, cut portion ends 33a interfere or impede movement of blade 11a through kerf space 15a. This causes one side of the cutting edge 31a of the saw blade to dull prematurely or the blade to be in danger of being pulled off the blade support wheels.

DISCLOSURE OF INVENTION

Accordingly, it is an object of the present invention to provide a method and apparatus for cutting multiple workpieces using a shuttle vise which reduces premature wear of a band saw blade and increases blade longevity.

It is another object of the present invention to provide a method and apparatus for cutting multiple workpieces which increase cutting precision and accuracy.

Still another object of the present invention is to provide a method and apparatus for cutting multiple workpieces which can be retrofit to existing band saw apparatus.

Another object of the present invention is to provide a method and apparatus for cutting multiple workpieces using a shuttle vise which increases cutting productivity.

It is a further object of the present invention to provide a method and apparatus for cutting multiple workpieces using a shuttle vise which is durable, compact, easy to maintain, has a minimum number of components, is easy to use by unskilled personnel, and is economical to manufacture.

The present invention includes a method of cutting at least one elongated workpiece with a saw assembly. The method comprises the steps of positioning the workpiece across a cutting line, and cutting the workpieces along the cutting line by advancing the saw blade while moving at least one of the cutting blade and the workpiece along the cutting line from a starting position, on one side of said workpiece, to a parked position, on an opposite side of the workpiece. In the parked position, the entire cutting blade is moved completely beyond the workpiece. This effects cutting of the workpiece and positions the blade to enable the next step in the method to be performed. The next step includes displacing at least one of the workpiece and the cut portion, while the cutting blade is in the parked position, away from the kerf. Thereafter, the method includes the step of returning at least one of the workpiece and the cutting blade from the parked position to the starting position. The preferred embodiment of the present process also includes the step of accomplishing displacement of the cut portion by moving the workpiece across the cutting line to engage and push the cut portion in a direction away from the cutting line.

In another aspect of the present invention, an apparatus for cutting workpieces which increases the blade life is provided which includes a cutting device, such as a band saw, and a feed assembly, such as a feed table with shuttle and fixed vises. The apparatus includes a cutting control coupled to control movement until the cutting blade is advanced to a parked position, and a feed table control coupled to advance the workpiece across the cutting line after the blade is in the parked position. The workpiece pushes the cut parts out of the cutting kerf and the feed assembly then returns the workpiece to the original side of the cutting line for return of the cutting blade to the starting position.

Accordingly, the present invention provides a method and apparatus for cutting workpieces using a shuttle vise which reduces wear of a band saw blade by moving the cut parts or independent cut pieces, and most preferably the workpiece, out of the cutting kerf and away from the band saw blade before the blade is returned to the starting position.

The apparatus of the present invention has other objects and features of advantage which will be more readily apparent from the following description of the Best Mode of Carrying Out the Invention and the appended claims, when taken in conjunction with the accompanying drawing.

BRIEF DESCRIPTION OF THE DRAWING

The purpose and advantages of the present invention will be apparent to those skilled in the art from the following detailed description in conjunction with the appended drawings in which:

FIG. 1 is a fragmentary top plan schematic view, in partial cross-section, of a prior art band saw apparatus illustrating the cutting of multiple workpieces thereon.

FIG. 2 is a fragmentary top perspective view of a rectangular tubular workpiece illustrating flaring of the end (broken lines) caused by relief of internal stresses upon cutting of the workpiece.

FIG. 3 is an enlarged, top plan view, in partial cross-section, of the cutting kerf of the prior art band saw apparatus of FIG. 1, taken substantially along the line bounded by 3—3 of FIG. 1.

FIGS. 4A through 4D show a series of top plan schematic views of a band saw apparatus and method constructed in accordance with the present invention for cutting multiple workpieces thereby.

FIG. 5 is a fragmentary, top plan schematic view of a band saw and feed table assembly constructed in accordance with the present invention.

BEST MODE OF CARRYING OUT THE INVENTION

The band saw apparatus and method of the present invention repositions the cut portions of the workpiece away from the cutting kerf to prevent contact with the band saw blade during retraction to the original starting position. This step of moving the cut portions reduces wear of the saw blade and prevents pulling the blade off the drive wheels on the return stroke. While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 4A through 4D, where the present band saw apparatus, generally designated 10b, is illustrated. A bundle 16b of multiple workpieces 13b is supported on a saw table. Briefly, band saw apparatus 10b includes a saw head assembly (not shown) which can be of a conventional construction and guides and drives a cutting blade (preferably a band saw blade) 11b along a cutting line 14b extending longitudinally through a cutting guide plate 36b in the saw table. As viewed in FIG. 4A, the saw head assembly guides and moves blade 11b between a staring position 28b (blade 11b shown in broken lines) and a parked position 37b (blade 11b shown in solid lines).

It is an important feature of the apparatus and method of the present invention that saw blade 11b can be moved to a parked position 37b in which the entire width dimension, W, of the saw blade cutting stretch is at a position beyond the side portion 27b of bundle 16b, which will be described in greater detail below.

Bundle 16b is releasably gripped between a pair of spaced-apart gripping jaws 24b and 24b' of fixed vise mechanism 17b, which is mounted atop a saw table or workpiece support fixture 12b. At least one of jaws 24b and 24b' moves between an engaged position (FIGS. 4A and 4B), securely gripping bundle 16b, and a non-engaged position (FIGS. 4B and 4C), releasing the workpieces for movement relative to the vise. A shuttle vise assembly, generally designated 21b, grips bundle 16b on a remote side of vise 17b from cutting line 14b. Shuttle vise assembly 21b is movably mounted to a track or guide rail structure 23b and reciprocates vise toward and away from cutting line 14b. Similarly, shuttle vise 21b includes a pair of spaced-apart gripping jaws 26b and 26b' positioned on opposite sides of bundle side portions 27b and 27b' for gripping of the workpiece bundle therebetween. Jaws 24b, 24b'; and 26b, 26b' of each vise mechanism 17b, 22b, respectively, grip bundle 16b in a manner permitting moving and cutting of workpieces 13b as a unit.

In accordance with the present invention, a method and band saw apparatus for cutting elongated workpieces 13b is provided which repositions cut portions 32b away from cutting kerf 15b and cutting line 14b after blade 11b has cut through bundle 16b and is resting in the parked position 37b. Hence, upon return of blade 11b through kerf 15b to starting position 28b to complete the cutting cycle, blade 11b will not inadvertently nor adversely contact individual cut parts or workpiece portions 32b since they will not be protruding into kerf space 15b. Accordingly, the cutting edge 31b of blade 11b will wear more evenly which will reduce blade deviation from the desired cutting line 14b. Contrary to the prior art apparatus, the present invention is more precise, efficient and, further, increases the life expectancy of saw blade 11b. Additionally and very importantly blade 11b will not be in danger of being hooked or pinched between workpieces 13b and cut parts 32b and pulled from the blade supporting and driving wheels.

For the ease of description, the present invention will primarily be described in reference to severing shorter parts or cut portions 32b which are not generally secured by a vise mechanism but are supported on one side by a workpiece stop or rest 20b, as shown in FIG. 4A. However, it will be appreciated that the method and apparatus of the present invention will work equally well when severing longer parts 32b of the type illustrated in FIGS. 1, 3 and 5 and gripped by a vise 20a. Moreover, while the present invention is preferably employed to sever multiple workpieces 13b collectively held as bundle 16b, it will be understood that the present invention is applicable to cutting a single elongated workpiece 13b (FIG. 5) without departing from the true spirit and nature of the present invention.

Turning now to FIG. 4D, band saw apparatus 10b is illustrated at a starting point or position 28b of the cutting cycle and workpieces 13b are positioned between jaws 26b, 26b' of shuttle vise mechanism 22b and between jaws 24b, 24b' of fixed vise mechanism 17b. Initially, jaws 26b, 26b' cooperate to securely retain workpieces 13b therebetween whereas jaws 24b, 24b' are moved to the non-engaged position (shown in FIGS. 4B and 4C) for slidable receipt of workpieces 13b. This enables shuttle vise mechanism 22b to move forward, while gripping workpieces 13b as a unit or bundle 16b, in order to position workpieces 13b across cutting line 14b for cutting. Once the positioning is proper, which is usually controlled automatically by a feed table controller 41 (FIG. 5), jaws 24b, 24b' or fixed vise mechanism 22b are moved to the engaged position, which secures workpieces 13b therebetween and stabilizes bundle 16b for cutting at a location close to cutting line 14b. Saw blade 11b is now ready to be brought into contact with side portion 27b' of bundle 16b to cut through the bundle.

Cutting of bundle 16b is accomplished by moving the cutting blade while advancing one of the cutting head and the bundle of pieces along the cutting line. As best may be seen in FIG. 5, it is preferable to move cutting head 42, which carries blade 11b, in the direction of arrow 40b along cutting line 14b. In most band saw assemblies the workpieces are held in a fixed position and the saw head assembly is moved, relative bundle 16b, from starting position 28b to parked position 30b. FIG. 4D illustrates that the saw blade is moved in the direction of arrow 40b along cutting line 14b. Accordingly, advancing blade 11b contacts bundle side portion 27b' and cuts through each individual workpiece 13b to sever cut portions 32b therefrom. As above-indicated and as shown in FIG. A, this motion randomly misaligns cut portions 32b relative kerf 15b so that protrusion of ends 33b into kerf 15b occurs. Subsequently, blade 11b comes to rest in parked position 37b, at which position width dimension, W, of the cutting stretch of blade 11b is caused to move completely across bundle 16b. Unlike prior band saws, the entire width dimension of blade 11b is positioned beyond the side portion 27b of bundle 16b so that blade 11b will not interfere with movement of bundle 16b across cutting line 14b Such positioning is critical since cut parts or portions 32b are to be repositioned in a direction away from kerf 15b while blade 11b remains in parked position 37b.

FIG. 5 illustrates a vertical band saw 10b in which cutting head 42 is mounted for movement horizontally along cutting line 14b. Cutting control means 43 generally controls movement of cutting head 42 in a manner well known for band saws, but in the improved cutting assembly 10b of the present invention controller 43 is advantageously connected to limit switch means which cooperates with stop means or block 46 that can be adjustably mounted to a frame portion or rail 47 for the band saw. Rail 47 extends in a direction along cutting line 14b so that the distance over which head assembly 42 is moved can be set by adjusting and fixing the position of stop 46. Limit switch 44 is electrically connected to cutting controller 43 by conductor means 48.

In operation the user can select whether to operate the band saw in a "standard" mode or a "blade-saver" mode through user input button 49. In a standard mode advancement of head 42 in the direction of arrow 40b is stopped when limit switch 44 engages the front shoulder of stop 46. At this point front cutting edge 32b will be through workpiece 13b cutting a part therefrom. Blade 11b, however, will not be in the parked position. Thus, when controller 43 receives a first cutting control signal from switch 44, indicating that the workpiece has been cut through, the cutting controller will return cutting head to the starting position if the operator has selected the standard mode. Standard mode reduces cycle time, but at the expense of blade dulling and possible blade hooking.

If the operator uses input 49 to select blade-saver mode, the first cutting control signal occurring when switch 44 contacts the front edge of stop 46 is disregarded and cutting head 42 continues to move in the direction of arrow 40b until switch 44, which is resiliently biased outwardly, passes over block or stop 46, at which point switch 44 communicates a second cutting control signal indicating that blade 11b is in the parked position. In the apparatus of the present invention, therefore, stop or block 46 may advantageously have a width dimension about equal to the distance between a standard cut through position and the parked position. Controller 43 stops advancement of the cutting head upon receipt of the second cutting control signal and causes the cutting head to stay in the parked position until a feed control signal is received from feed controller 41, which will be described in more detail below.

While illustrated in FIG. 5 as being implemented by a limit switch and cooperatively positioned stop, it will be understood that in more sophisticated cutting controller or computers 43, the position of cutting head 42 will be sensed at all times, and input means 49 can merely input the locations for a standard return and a blade-saver return.

As best seen in FIG. 4B, bundle 16b preferably is employed to displace cut parts or portions 32b away from kerf 15b. Jaws 25b and 25b' of fixed vise mechanism 17b are moved to the non-engaged position so that bundle 16b is free to slidably move relative to table 12b and to jaws 25b and 25b'. Once jaws 25b and 25b' have been disengage from side portions 27b and 27b' of bundle 16b, shuttle vise assembly 21b moves toward cutting line 14b in the direction of arrow 50 (FIG. 4B). Bundle 16b advances forward until workpiece ends 34b contact cut portion ends 33b. Such advancement continues until bundle 16b displaces cut portions 32b to a position away from and clear of kerf 15b, as shown in FIG. 4B. It will be understood that blade 11b remains parked in parked position 37b for the duration of this sequence.

Thereafter, FIG. 4C illustrates that shuttle vise 21b retracts bundle 16b in the rearward direction of arrow 51 to reposition all portions of bundle 16b back over the cutting line 14b, preferably also to a spaced distance from cutting kerf 15b. During this sequence, jaws 25b and 25b' of fixed vise mechanism 17b remain in the non-engaged position while blade 11b remains in the parked position. Only when bundle 16b has been fully retracted so that neither workpiece ends 34b nor cut portion ends 33b protrude into cutting kerf 15b, as shown in FIG. 4C, is a feed control signal generated by feed controller 41 and communicated through electrical conductor 52 (FIG. 5) to cutting controller 43. Upon receipt of the feed control signal after the second cutting control signal, controller 43 returns cutting head 42 and blade 11b to starting position 28b. The position of shuttle vise 21b on guide ways 23b is communicated to feed controller 41 through conductor means 53.

The saw head assembly returns blade 11b substantially along cutting line 14b in the direction of arrow 43b (FIG. 4C) from parked position 37b to starting position 28b, where blade 11b comes to rest at the starting position. Accordingly, saw blade 11b is free from interference or obstruction while returning to starting position 28b. Hence, the cutting edge 31b will not become worn through inadvertent contact with the workpieces or cut portions 32b during the return stroke when the cutting assembly is in blade saver mode.

Referring now to FIG. 4D, bundle 16b is once again prepared for cutting. Fixed vise 17b grips the workpieces and shuttle vise mechanism 22b opens and moves away from cutting line 14b. The shuttle vise then grips the workpieces and fixed vise 17b opens. The shuttle vise may then move in the direction of arrow 51 so that portions of workpieces 13b are placed back across cutting line 14b to the desired cutting position. Jaws 25b and 25b' are then moved to the engaged position to securely grip respective side portions 27b and 27b' of bundle 16b for retainment therebetween. Accordingly, the cutting cycle in accordance with the present invention has been completed.

The present invention has primarily been described in conjunction with one fixed vise mechanism 17b. However, it will be appreciated that, when cutting multiple longer cut portions 32b from multiple elongated workpieces 13b, a second fixed vise mechanism 20a may be employed to grip and secure cut portions 32b as a bundle on both sides thereof. Accordingly, the corresponding jaws of fixed vise 20a will cooperate and move between the engaged and the non-engaged position to secure cut portions 32b at moments of the cutting cycle substantially similar to the first fixed vise mechanism 17a.

As will also be understood controllers 41 and 43 can be combined in a single controller or computer with suitable feedback means providing the computer with real time input as to the positions of shuttle vise 21b and saw head 42.

What is claimed is:

1. A method of cutting at least one workpiece with a saw assembly having a cutting blade defining a cutting stretch, said method comprising the steps of:
    positioning said workpiece for cutting by said blade along a cutting line;
    cutting said workpiece by moving at least one of said cutting blade and said workpiece in a manner advancing said cutting blade relative said workpiece along said cutting line from a starting position on one side of said workpiece to a parked position on an opposite side of said workpiece with the entire cutting stretch of said cutting blade being positioned beyond said workpiece to cut through said workpiece and form a cut portion independent of said workpiece;
    while said cutting blade is in said parked position, displacing said workpiece and said cut portion away from said cutting line by displacing said workpiece toward said cut portion until said workpiece contacts and moves said cut portion away from said cutting line by a distance sufficient for said cutting blade to be returned along said cutting line without touching said cut portion, and thereafter displacing said workpiece away from said cutting line by a distance sufficient for said cutting blade to be returned along said cutting line without touching said workpiece; and
    after said displacing step, returning at least one of said workpiece and said cutting blade in a manner retracting said cutting blade relative said workpiece from said parked position to said starting position.

2. The method of cutting a workpiece as defined in claim 1 wherein,
    said cutting step is accomplished moving said cutting blade relative to said workpiece along said cutting line.

3. The method of cutting a workpiece as defined in claim 1 wherein,
    said step of displacing said cut portion away from said cutting line is accomplished by displacing said workpiece across said cutting line in one direction into said contact with said cut portion; and
    said step of displacing said workpiece away from said cutting line is accomplished by thereafter displacing said workpiece back across said cutting line in an opposite direction.

4. The method of cutting as defined in claim 1 wherein,
    said cutting step is accomplished using a band saw.

5. The method of cutting a workpiece as defined in claim 1 wherein,
    said displacing step is accomplished by gripping said workpiece with a movable shuttle vise assembly mounted for motion transverse to said cutting line and displacing said workpiece with said shuttle vise toward said cut portion.

6. The method of cutting a workpiece as defined in claim 1 wherein,
    said returning step is accomplished by moving said cutting blade relative to said workpiece along said cutting line.

7. The method of cutting a workpiece as defined in claim 1, wherein,
    said positioning step is accomplished by mounting said workpiece in a fixed vise mechanism and securely gripping said workpiece on opposing sides thereof at an end of said workpiece proximate said cutting line, and
    said cutting step is accomplished by moving said cutting blade along said cutting line.

8. The method of cutting at least one elongated workpiece as defined in claim 1 wherein,
    said saw assembly is a vertical band saw apparatus.

9. The method of cutting a workpiece as defined in claim 1 wherein,
    said positioning step is accomplished by positioning a plurality of workpieces in side-by-side relation in a bundle with ends of said plurality of workpieces extending across said cutting line;
    during said cutting step, cutting said plurality of workpieces along said cutting line to produce a plurality of cut portions; and
    during said displacing step, displacing said plurality of said cut portions and said plurality of workpieces away from said cutting line by displacing said workpieces toward said cut portions until said workpieces contact and pushing said cut portions away from said cutting line by a distance sufficient for said cutting blade to be returned along said cutting line without touching said cut portions, and thereafter displacing said workpieces away from said cutting line by a distance sufficient for said cutting blade to be returned along said cutting line without touching said workpieces.

* * * * *